United States Patent Office 3,095,401
Patented June 25, 1963

3,095,401
GRAFT COPOLYMER VINYLTHIOALKYL UNSATURATED CARBOXYLATES ON A POLYMERIC BACKBONE FORMED FROM A MONOVINYLIDENE COMPOUND
La Verne N. Bauer, Cheltenham, Pa., assignor to Rohm & Haas Company, Philadelphia, Pa., a corporation of Delaware
No Drawing. Filed July 20, 1959, Ser. No. 828,053
2 Claims. (Cl. 260—45.5)

This invention concerns esters of carboxylic acids of 3 to 4 carbon atoms having olefinic unsaturation and an alcohol having a vinylthioalkyl group. These esters have the formula $$CH_2\!=\!CHSC_nH_{2n}(OC_nH_{2n})_mOCOCR\!=\!CHR°$$

wherein $n$ is an integer from 2 to 3, $m$ has a value of 0 to 1, and R and R° represent hydrogen or one of these represents the methyl group.

There have previously been prepared esters of unsaturated carboxylic acids and alcohols having a vinoxyalkyl group. The esters of this invention, however, differ surprisingly from these previously known esters in that the sulfur alters considerably the polymerizing characteristics of the esters of this invention and causes the polymers which are obtained therefrom to have valuable new properties which are not encountered in the case of polymers derived from the previously known vinoxyalkyl esters.

Esters of this invention may be prepared by transesterifying an ester of a lower alkanol and an unsaturated carboxylic acid of the formula $HCR°\!=\!CRCOOH$ and an alcohol of the formula $CH_2\!=\!CHSC_nH_{2n}(OC_nH_{2n})_mOH$. The reaction is carried out by heating a mixture of the lower alkyl ester and a defined alcohol in the presence of an alkaline transesterification or alcoholysis catalyst. Lower alkanol is displaced by the vinylthioalkyl-containing alcohol and is distilled off, usually in an azeotropic mixture with the lower alkyl ester. The catalyst may then be destroyed, if desired, and the vinylthioalkyl-containing ester purified by distillation.

The temperature of reaction may vary from about 50° to about 125°, depending upon the lower alkyl ester chosen as a starting material. In some cases the temperature may be kept at a relatively low level by the use of a volatile solvent which will form an azeotrope with the displaced alkanol, such as, for example, benzene, toluene, or n-heptane.

Suitable catalysts for promoting alcoholysis include the alkali metal alcoholates such as sodium methoxide, sodium ethoxide, potassium propoxide, or sodium butoxide. There may also be used alkali metal alcoholates of the vinylthioalkyl-containing alcohols. Similarly, quaternary ammonium alcoholates may be used, such as tetramethylammonium methoxide, trimethylbenzylammonium methoxide, or dimethyldibenzylammonium ethoxide. The concentration of catalyst may vary from about 0.05% to about 2% by weight of the reaction mixture. Catalyst may be added at the start of the reaction or part of the catalyst may be taken at the start and additional amounts supplied as the reaction proceeds.

The alkyl esters may be the methyl, ethyl, propyl, or butyl esters of acrylic, methacrylic, or crotonic acids.

The alcohols supplying the vinylthio- group may be 2-vinylthioethanol, 1-vinylthio-2-propanol, 1-vinylthio-3-propanol, 2-(2-vinylthioethoxy)ethanol, 1-(2-vinylthioethoxy)-2-propanol, 2-(1-vinylthio-2-propoxy)ethanol, 1-(2-vinylthioethoxy)-3-propanol, or 1-(2-vinylthiopropoxy)-2-propanol. The propylene portion may be straight or branched, and when two alkyl portions are present, they may be the same or different.

During the transesterification reaction, it is highly desirable that there be present a powerful polymerization inhibitor or inhibitors. Particularly useful inhibitors include p-anilinophenol, N,N' - diphenyl - p - phenylenediamine, and selenium dioxide. It is desirable that a similar polymerization inhibitor be present in the distilled product, if it is to be stored.

The transesterification reaction is conveniently carried out by mixing lower alkyl ester and vinylthio-containing alcohol, supplying alcoholysis catalyst, and heating the mixture. Displaced alkanol is desirably taken off, any excess lower alkyl ester is distilled, and the product is distilled under reduced pressure. It is desirable that the product be distilled into a vessel containing a small amount of polymerization inhibitor, the receiver being chilled. The product is desirably stored at low temperatures unless it is to be used promptly, for the pure vinylthioalkyl acrylates, methacrylates, and crotonates have a marked tendency to polymerize.

The monomers may be polymerized with ionic or free radical catalysts. Homopolymers may be formed in bulk or in solution. The monomers may be used in conjunction with other polymerizable ethylenically unsaturated compounds to form copolymers with ionic or free radical catalysts. Such copolymerizations may be carried out in bulk or in solution. Furthermore, the monomers of this invention may be added to solutions of already formed polymers and caused to form polymers therewith.

When polymerizations are carried out under favorable conditions, it is possible to observe two stages of polymerization. Since there is a difference in reactivity of the vinyl group supplied by the vinylthioalkyl portion and the unsaturated group of the acid residue, one of these linkages may be polymerized in preference to the other. Thus, with cationic catalysts, the vinyl group may be caused to form polymers in a first stage and later polymerization may be effected through the olefinic linkage of the acid portion. On the other hand, anionic initiators may be used to form polymers through the unsaturated linkage of the acid residue and later the vinyl group may be utilized in forming a final polymer. Again, with free radical catalysts, the course of polymerization may be followed through a soluble stage to an insoluble stage which involves both types of unsaturated linkages.

Initiators coming within the above-noted classes are well known. The free radical initiators include such compounds as acetyl peroxide, benzoyl peroxide, lauroyl peroxide, tert-butyl perbenzoate, and the like, and azo catalysts such as azodiisobutyronitrile and dimethyl azodiisobutyrate. Anionic catalysts include alkali and alkaline earth metals, their amides, and their salts of Lewis acids of $pK_a$ of 15 to 35. Cationic catalysts include stannic chloride and boron trifluoride and its complexes with coordinating oxygenated organic compounds, such as boron trifluoride-diethyl ether, boron trifluoride-dibutyl ether, or boron trifluoride-acetic acid complexes.

Polymers obtained by anionic catalysts can be converted into insoluble resins by use of a free radical catalyst or an acidic catalyst or upon oxidation. Likewise, polymers formed with cationic catalyst can be converted to cross-linked polymers with free radical initiators or upon oxidation or by use of an anionic catalyst.

The polymers which are obtained in these ways are marked by densities which are greater than those of corresponding oxygen analogs, extreme hardness for an organic resin, and an unusual gloss. These polymers are more resistant to solvents than the analogs. Because of this unusual combination of properties, moldings, castings, and coatings prepared with the aid of the esters of this invention have unusual hardness, gloss, and solvent resistance.

Additional details of the process for preparing the vinylthioalkyl unsaturated carboxylates of this invention are presented in the following examples which are given for purposes of illustration and not by way of limitation. Parts therein are by weight unless otherwise specified.

*Example 1*

(a) A three-necked vessel was fitted with a thermometer, dropping funnel, stirrer, fractionating column, and electrically heated oil bath. Thereto were charged 28 parts of β-hydroxyethyl vinyl sulfide, 93 parts of methyl acrylate, and 2 parts of p-anilinophenol. There was prepared a solution of sodium methoxide by dissolving 0.2 part of sodium in 5 parts of methanol. About half of this solution was charged to the vessel. The vessel and contents were then heated with stirring. An azeotropic mixture of methanol and methyl acrylate (about 50:50 by weight) was formed and distilled off with an overhead temperature of 63°–65° C. After 54 minutes, the balance of the methanol solution of sodium methoxide was added along with 20 parts of methyl acrylate containing 0.5 part of p-anilinophenol. The pot temperature at this time was 91.5° C. and the overhead temperature was about 64°–65° C. Two 20-part portions of methyl acrylate containing 0.5 part of p-anilinophenol were added at 107 minutes and 159 minutes respectively. After 195 minutes the batch was subjected to fractional distillation. After a forerun of methyl acrylate, fractions were taken off between 60°/1.8 mm. and 80°/2 mm., amounting to 9.9 parts, which corresponded in composition to 2-vinylthioethyl acrylate. The refractive index at 25° was 1.4982. This material was found to form a polymer readily. The polymer was clear, hard, and glossy.

There were also isolated fractions of methyl β-(2-vinylthioethoxy)propionate (boiling point 95°–98° C./2.2 mm.) and 2-vinylthioethyl β-(2-vinylthioethoxy)propionate.

(b) A solution of 0.5 part of sodium was prepared in 52 parts of β-hydroxyethyl vinyl sulfide. There was charged to a reaction vessel 52 parts of a methyl acrylate and 1 part of p-anilinophenol. The β-hydroxyethyl vinyl sulfide was slowly run into the methyl acrylate while the temperature was maintained at about 20°. The mixture was then warmed to about 50° and stirred for an hour. It was then fractionally distilled. The fraction taken at 54°–96° C./2 mm. amounted to about 8 parts and was 2-vinylthioethyl acrylate.

*Example 2*

There were charged to the reaction vessel 52 parts of β-hydroxyethyl vinyl sulfide, 86 parts of methyl acrylate, 0.6 part of N,N′-diphenyl-p-phenylenediamine, and 1 part of tetraisopropyl titanate. The mixture was heated to reflux temperatures and an azeotrope taken off at 63°–65° C. There was gradually added methyl acrylate to a total of 45 parts. When the azeotrope was no longer obtained, the temperature was raised and methyl acrylate was distilled off at 80°–81°. Distillation was continued under reduced pressure and at 59°–70° C./2 mm. there was distilled off the desired ester, which was collected in a vessel containing 0.05 part of p-anilinophenol and which was chilled in an ice bath. A total of 68 parts of 2-vinylthioethyl acrylate was obtained, an 86% yield. This product gave the correct analysis for vinylthioethyl acrylate and had a saponification number of 355. It was stored at 0° C.

*Example 3*

(a) There were charged to a reaction vessel equipped as above 28 parts of β-hydroxyethyl vinyl sulfide, 108 parts of methyl methacrylate, and 2 parts of p-anilinophenol. There was prepared a solution of sodium methoxide by dissolving 0.25 part of sodium metal in 5 parts of methanol. About half of this solution was added to the batch at the beginning. The batch was heated under reflux with overhead temperatures of 64°–67° C., and the azeotrope was taken off (85% methanol, 15% methyl methacrylate), and the rest of the catalyst solution was added after 90 minutes of reaction. Addition was made of 20-part portions of methyl methacrylate containing 0.5 part of p-anilinophenol after 60, 90, 105, 170, and 244 minutes of reaction. After 6 hours, volatile material was distilled from the reaction vessel under reduced pressure, leaving 10 parts of residue in the reaction vessel. The distilled material was then fractionated through a packed column. After a forerun of methyl methacrylate, there was obtained at 75°–79° C./2 mm. 2-vinylthioethyl methacrylate, amounting to 32.6 parts. This product had a composition by analysis which corresponded to the desired vinylthioethyl methacrylate, the refractive index, $n_D^{25}$, was 1.4971. A portion of the product was stored at Dry Ice temperature for many days without polymerization. Another portion was treated with p-anilinophenol and stored at 0° successfully. Another portion was treated with 0.05% of benzoyl peroxide to form a hard, clear, insoluble polymer.

The above procedure was repeated with substitution of 0.65 part of di-β-naphthol and 0.2 part of copper powder for the above inhibitor. The distillate was collected in the presence of 0.5 part of di-β-naphthol.

(b) To a reaction vessel equipped as above there were charged 32.6 parts of β-hydroxyethyl vinyl sulfide, 0.4 part of di-β-naphthol, 0.4 part of cuprous chloride, 35 parts of anhydrous powdered sodium bicarbonate. The batch was cooled to 10° C. To the cooled batch was slowly added methacryloyl chloride while the temperature of the reaction mixture was maintained at 10°–15° C. The total amount of methacryloyl chloride added was 32.7 parts. The reaction mixture was heated and stirred at 45°–50° for two hours. It was cooled to 15° and treated with water and benzene. The organic layer was separated, treated with potassium carbonate, and washed with water. It was dried over potassium carbonate and fractionally distilled. At 72°–74°/2.3 mm. a fraction of 93% pure 2-vinylthioethyl methacrylate was obtained.

*Example 4*

A solution of sodium methoxide was prepared by dissolving 0.25 part of sodium in 5 parts of methanol. About half of this solution was charged to a reaction vessel equipped as above along with 30 parts of methyl crotonate, 28 parts of β-hydroxyethyl vinyl sulfide, 0.64 part of di-β-naphthol, and 0.1 part of copper powder. The batch was then heated with distillation of an azeotrope, the batch temperature varying from 101° to 133° C. with overhead temperatures of about 70° C. After 115 minutes, addition was made of 0.1 part of di-β-naphthol and the balance of the sodium methoxide solution. Heating was continued for 7 hours. The entire batch was then distilled under reduced pressure up to a temperature of 168° C./8 mm. This distillate was fractionated. After removal of methyl crotonate and an intermediate fraction there were collected 17 parts of clear, colorless distillate which by analysis corresponded to 2-vinylthioethyl crotonate. It distilled at 99°–100° C./4.4 mm. and had a refractive index, $n_D^{20}$, of 1.5055. This compound could be safely stored in the refrigerator in the presence of an inhibitor.

*Example 5*

There were charged to a reaction vessel equipped as above 200 parts of methyl methacrylate, 59 parts of 1-vinylthio-2-propanol, and 5 parts of p-anilinophenol. There was prepared a catalyst solution by dissolving 0.5 part of sodium in 10 parts of methanol. About half of this solution was added to the reaction vessel and the reaction mixture was heated to reflux temperatures. With overhead temperatures of about 70° a mixture of methanol and methyl methacrylate was removed over a period of about six and one half hours. The reaction mixture was cooled and treated with one part of p-anilinophenol and distilled. After a forerun of methyl methacrylate, there was obtained at 57°–60° C./<1 mm. a fraction of 65 parts of 1-vinylthio-2-propyl methacrylate. It had a saponification number of 302.1 (calcd. 301.6). It had a sulfur content of 169% (calcd. 17.2%). The refractive index, $n_D^{20}$, was 1.4883. There was obtained another fraction which distilled at 60°–64° C./<1 mm. amounting to 6.5 parts. This had a saponification number of 295 and was fairly pure 1-vinylthio-2-propyl methacrylate.

*Example 6*

The reaction vessel was charged with 37 parts of 2-(vinylthioethyloxy)ethanol, 60 parts of methyl methacrylate, and two parts of N,N'-diphenyl-p-phenylenediamine. A catalyst solution was prepared by dissolving 0.5 part of sodium in 10 parts of methanol. About half of this solution was added to the reaction vessel and the reaction mixture was heated under reflux with removal of the azeotrope. After 90 minutes and again after 170 minutes one fourth of the catalyst solution was added along with 20 parts of methyl methacrylate containing 0.1 part of the above inhibitor. The batch temperature reached 113° C. at the time there was no further formation of azeotrope. Excess methyl methacrylate was distilled off. Then, 0.5 part of the same inhibitor was added and the mixture fractionally distilled under reduced pressure. At 103° C./0.8 mm. there was obtained a fraction corresponding in composition to 2-(2-vinylthioethoxy)ethyl methacrylate. The product had the theoretical saponification number (260) and contained by analysis 15.1% of sulfur (theory 14.81%).

The refractive index, $n_D^{20}$, was 1.4933.

*Example 7*

The reaction vessel was charged with 41 parts of 1-(2-vinylthioethoxy)-2-propanol which boiled at 78° to 87° C./1–2 mm., 75 parts of methyl methacrylate and 2 parts of p-anilinophenol. A catalyst solution was prepared by dissolving 0.5 part of sodium in 10 parts of methanol and half of this solution was added to the reaction vessel. The reaction mixture was heated under reflux and the azeotrope was taken off. After about 90 minutes, 75 parts of methyl methacrylate, one part of p-anilinophenol, and about one-fourth part of the catalyst solution were added, and heating was continued. After three hours, there were added 50 parts of methyl methacrylate, one part of p-anilinophenol and the rest of the catalyst solution. Heating was continued until azeotrope was no longer obtained. The reaction mixture was heated under reduced pressure. As unreacted methyl methacrylate was stripped off, there was distilled the desired ester, 1-(2-vinylthioethoxy)-2-propyl methacrylate. This distilled at 110°–150° C./<2 mm.

In the same way there were reacted 40 parts of 1-(2-vinylthioethoxy)-2-propanol, 80 parts of ethyl crotonate, and one part of p-anilinophenol. A catalyst solution of sodium ethoxide in ethanol was prepared from 0.7 part of sodium in 15 parts of dry ethanol and half of this was added to the mixture, which was heated under reflux with distillation of a mixture of ethanol and ethyl crotonate. Additional ethyl crotonate was added from time to time until 80 parts were added while the balance of the catalyst was gradually added. The overhead temperature was carried to about 121° C. and the reaction mixture stripped. A main fraction was taken off at 120°–150° C./2–4 mm. It was identified by analysis as 1-(2-vinylthioethoxy)-2-propyl crotonate.

In the same way there can be prepared vinylthioethoxyethyl esters from acrylic acid. Likewise, there may be substituted other vinylthioalkoxyalkanols for the above. Although comparable alcohols with two, three, four or more oxygen-ether linkages can also be reacted, the monomers and the polymers therefrom suddenly change their character. With the increase of oxygen-ether groups above one, they become water-sensitive and lose progressively the unique properties of the particular esters defined by the above structural formula.

Polymers are readily formed from the compounds of this invention. Catalysts, heat, and light may all be utilized to cause polymerization.

Thus, a redistilled portion of 2-vinylthioethyl methacrylate was placed in a small glass-walled cell, and warmed to 50° C. for two days. A clear, exceptionally brilliant, hard polymer formed. It had a hardness of 9H (pencil scale) compared to 8H for poly(methyl methacrylate). Its density was 1.2538 (density of poly(methyl methacrylate) is 1.19). Its refractive index was 1.5617 ($n_D^{20}$ for poly(methyl methacrylate is 1.489). The polymer was insoluble in common solvents.

A portion of 2-vinylthioethyl methacrylate containing p-anilinophenol as inhibitor was treated with 0.1% of dimethyl azodiisobutyrate and heated to 77° C. Within about a half hour, a hard, glossy, dense polymer formed. Such a product is useful for optical parts and watch crystals. Because of good density, high refractive index, and remarkable brilliancy, the polymer is especially effective in costume jewelry.

A portion of 2-vinylthioethyl acrylate containing inhibitor was treated with 0.05% of azodiisobutyronitrile and warmed to 65° C. There resulted a clear, hard, glossy, insoluble polymer, having utilities comparable to those mentioned above.

A portion of 2-vinylthioethyl crotonate was treated with 1% by weight of dimethyl azodiisobutyrate. A nitrogen atmosphere was supplied. The mixture was heated to 100° C. There rapidly formed a polymer which was insoluble in toluene, acetone, and ethylene dichloride.

A portion of 2-(2-vinylthioethoxy)ethyl methacrylate was treated with 0.1% by weight of benzoyl peroxide and heated under nitrogen to 85°–95° C. for about 7 hours. There was formed a clear, hard, glossy polymer, which was insoluble in organic solvents.

A portion of 2-vinylthioethyl methacrylate was treated at 25° C. with boron trifluoride. It slowly polymerized. Another portion of the same ester was treated with boron trifluoride-dibutyl ether. Again, polymerization occurred slowly. In both cases a polymer formed which could be cured to an insoluble resin.

A portion of the same monomer was taken up in ethylene dichloride and treated with anhydrous boron trifluoride. The solution gradually became warm and viscous, due to formation of polymer through the vinyl grouping.

It should be noted that the vinylthioalkyl esters behave markedly differently from the oxygen analogs when polymerized cationically. The reaction is milder with only gradual evolution of heat, permitting the polymerization reaction to proceed at room temperatures at a rate permitting control. This is in marked contrast to the violent polymerization of the corresponding vinoxyalkyl esters at such temperatures.

A film was formed on a glass plate from the above solution and was baked at 90° C. overnight. It became harder and insoluble.

A portion of 11 parts of vinylthioethyl methacrylate was treated in 19 parts of dry toluene with a dispersion of sodium in toluene (50% of 2–40 micron particle size) to supply 0.3 part of sodium at −80° C. The mixture was gradually warmed. After 1.5 hours, it was noted that the color of the mixture had bleached. Stirring was continued at about 25° C. for 6 hours. Thereupon 0.3 part of hydroquinone was added (to prevent the vinyl group from polymerizing). The mixture was treated with methanol and then with acidified aqueous methanol to give a solution of polymer. Part of the solution was now treated with cobalt drier and air-dried for 16 hours to give a hard, glossy film. Another portion was treated with axodiisobutyronitrile and applied as a coating, which was heated to 100° C. The coating was glossy and hard. Another portion was then treated with boron trifluoride-diethyl ether complex and the solution then applied as a coating. It was air-dried, then baked for 20 minutes at 150° C. The film which resulted was exceptionally hard; it could not be scratched with a 9H pencil.

For the formation of copolymers there may be mixed one or more of the monomers of this invention and one or more other polymerizable vinylidene cmpounds, such as an acrylate ester, a methacrylate ester, acrylonitrile, methacrylonitrile, a vinyl ester, a vinyl ether, an itaconate ester, styrene, and the like. There may also be used ethylenically unsaturated compounds such as one or more fumarate esters or maleate esters or mixtures of these with one or more vinylidene monomers such as noted above. Other polymerizable comonomers of interest are N-vinyl-2-pyrrolidinone, methacryloxyethyl-2-pyrrolidinone, N-vinyloxazolidinone, methacryloxyethyloxazolidinone, and other vinyl or acrylic or methacrylic esters of hydroxyalkyl heterocyclic compounds.

Even the presence of as small an amount as 0.25% by weight of a vinylthioalkyl ester of this invention in a copolymer begins to influence significantly the properties of the final copolymer. There is no fixed upper limit, except in general enough of the other olefinically unsaturated comonomer or comonomers should be used to provide the combination of properties of the final copolymers. This upper limit then varies from about 85% to 95% of a vinylthioalkyl ester of this invention.

As an example of a copolymer, there was copolymerized a mixture of 0.25 part of 2-vinylthioethyl acrylate and 99.75 parts of methyl methacrylate with 0.07% of benzoyl peroxide. The mixture was heated at 100°–125° C. over 8 hours. There resulted a clear, hard casting. A specimen was soaked in ethylene dichloride for seven days. Volumes were determined before and after soaking. The increase in volume was 4.4%.

Another copolymer was made by the same method from two parts of 2-vinylthioethyl acrylate and 98 parts of methyl methacrylate. A swelling ratio of a specimen of this copolymer was 3.1. The heat distortion temperature was 104° C.

A similar copolymer from one part of 2-vinylthioethyl methacrylate and 99 parts of methyl methacrylate had a swelling ratio of 3.5. Normal poly(methyl methacrylate) dissolved under these conditions.

There were mixed 10 parts of vinyltoluene, 0.5 part of 1-methyl-2-vinylthioethyl methacrylate, and 0.002 part of benzoyl peroxide. The mixture was protected with nitrogen and heated at 70° C. for two days. A resin formed which was insoluble in toluene, benzene, and ethylene dichloride.

Copolymers were prepared by mixing 0.025 part of azodiisobutyronitrile, one part of 2-vinylthioethyl acrylate, and 9 parts of another vinylidene compound, there being used in separate cells N-vinyl-2-pyrrolidinone, lauryl acrylate, lauryl methacrylate, acrylonitrile, and vinyl triethoxysilane, respectively. These mixtures were heated at 60° to 70° C. for 20 hours. In each case a copolymer formed.

A copolymer was prepared for 6.3 parts of methyl methacrylate, 2.7 parts of di-n-butyl itaconate, 1.02 parts of 2-vinylthioethyl methacrylate, using 0.003 part of dimethyl azodiisobutyrate and maintaining temperatures at 60° to 67° C. for three days. The resulting copolymer was brilliant, clear, and hard.

Apparatus was prepared by baking out moisture from the surface. Liquid ammonia was distilled into it and condensed therein. Sodium amide was formed in solution by addition to the ammonia of sodium metal, a trace of ferric chloride, and passage of air. A mixture of 200 parts of ethyl acrylate and 158 parts of 2-vinylthioethyl acrylate was slowly added to the chilled liquid ammonia solution. There formed rubbery solid polymer which was separated from the ammonia by decantation and was washed with petroleum ether. A portion of this copolymer was dissolved to give a 25% solution (by weight) in methyl methacrylate which contained 0.005% of the monomethyl ether of hydroquinone. There was added 0.1% of azodiisobutyronitrile. The solution was poured on a plate and heated at 60° C. In about 10 minutes a gel was observed and a short time later the film became hard and insoluble. It had a Barcol hardness of 34.

There were placed in a reaction vessel equipped with a stirrer 2.18 parts of a 50% dispersion of sodium metal in toluene and 68.1 parts of anhydrous toluene. The mixture was maintained under a nitrogen atmosphere. To it there were slowly added 40 parts of a mixture of monomers consisting of 10 parts of 2-vinylthioethyl methacrylate and 30 parts of methyl methacrylate. The resulting mixture was stirred and maintained at 25° C. for 20 hours. At this time, there were added 3 parts of anhydrous ethanol (to dissolve the sodium). At 22 hours, there were added 74 parts of anhydrous toluene and the mixture was stirred for an additional two hours. The reaction mixture was then filtered and there were obtained 147.3 parts of a solution of copolymer. Analysis showed that this solution contained 24% of a polymer solid. A portion of 23.8 parts of solution was treated with about 2 parts of glacial acetic acid to react with any sodium present. The treated solution was filtered to give a greenish filtrate which was diluted with an equal weight of anhydrous toluene. This solution was applied as a coating on a plate which was baked for 2 hours at 150° C. There resulted a clear, hard, glossy film having a hardness of at least 8H. Another portion of the solution was treated with 1% of its weight of benzoyl peroxide and applied as a film to a plate. The plate was baked for one hour at 150° C. to provide a clear, hard, glossy film. Another portion of the solution was treated with 4% of azodiisobutyronitrile. This solution was likewise applied to a plate which was baked for an hour at 100° C. to give a clear, hard, glossy film.

A three-gram portion was treated with 2 drops of a 20% boron trifluoride-etherate, flowed onto a plate, air-dried for 15 minutes, and baked at 150° C. for 20 minutes. A clear, glossy, hard film resulted. It could not be scratched with a 9H pencil. It showed good solvent resistance to materials such as toluene.

There were mixed 2 parts of n-butyl vinyl ether and one part of 2-vinylthioethyl methacrylate and 6 parts of methyl chloride. This mixture was cooled to −80° C., whereupon it was treated with about 0.02 part of boron trifluoride. The mixture was allowed to warm to 30° C., at which time there were added 0.02 part of hydroquinone and 5 parts of toluene to give a solution of copolymer. This was washed with 10 parts of an aqueous 10% sodium hydroxide solution and then with water. The solution was treated with 0.02 part of benzoyl peroxide and flowed on a plate which was air-dried for 20 minutes and baked at 150° C. for 15 minutes. A colorless film resulted.

A particularly valuable use of the monomers of this invention is in the cross-linking of preformed vinylidene polymers. The resulting polymers are unusually glossy and hard and rather solvent-resistant. They do not attain, however, the almost complete resistance to solvents which is exhibited by the copolymers made by mixing monomers. For this reason, they retain a degree of flexibility, particularly in the presence of added plasticizers.

The following examples are given to illustrate the use of the vinylthioalkyl esters in conjunction with preformed polymers of copolymers.

To 13.3 parts of a 30% solution of a polymer of methyl methacrylate in an ether ester solvent (viscosity 710 centipoises at 30° C.) there were added one part of freshly distilled 2-vinylthioethyl methacrylate and 10 parts of toluene. The resulting solution was filmed on a plate, air-dried for 15 minutes, and then baked at 150° C. for 15 minutes. There resulted a glossy film. This film was not completely insoluble. When, however, another solution of the same composition was prepared and treated with 0.02 part of benzoyl peroxide and then filmed on the plate which was dry-baked, there resulted a clear, glossy, hard film with a hardness of at least 9H.

To 10 parts of a 40% solution of poly(n-butyl methacrylate) in hydrocarbon solvents (viscosity of 1500 centipoises at 30° C.) there were added one part of 2-vinylthioethyl methacrylate and 10 parts of toluene. A film was formed from this solution on a plate which was air-dried for 15 minutes and then baked for 15 minutes at 150° C. to give a glossy, hard film. A similar solution was treated with 0.02 part of benzoyl peroxide to give a solution which was filmed in the same way. The resulting film was somewhat harder and somewhat more solvent-resistant.

A copolymer was prepared in ethylene dichloride from a mixture of ethyl methacrylate and methyl acrylate in a ratio of 3:1. The copolymer content was 43.8%. To 9.13 parts of the solution of this copolymer there were added 1 part of 2-vinylthioethyl methacrylate and 12 parts of ethylene dichloride. There was dissolved in this solution 0.003 part of benzoyl peroxide. The solution was then applied to a plate which was air-dried and baked at 150° C. for 15 minutes. There resulted a glossy, clear film of 3H hardness. This coating was of the type which is excellent for metal decorating.

A copolymer was formed from 60 parts of n-butyl methacrylate and 40 parts of methyl methacrylate in toluene and 0.4 part of methacrylic acid. The copolymer concentration was adjusted to 40%, the viscosity of the solution then being 480 cps./30° C. There were mixed 10 parts of this solution of copolymer, 2.2 parts of 2-vinylthioethyl methacrylate, 0.002 part of benzoyl peroxide, and 7.8 parts of toluene. The resulting solution was applied to a plate which was air-dried and then baked at 150° C. for 15 minutes. A very glossy, hard film resulted with a hardness of at least 3H.

A copolymer was prepared from a mixture of methyl methacrylate and ethyl acrylate in a ratio of 55:45 and the copolymer concentration adjusted with toluene to 40%. To 10 parts of this solution there were added 0.44 part of 2-vinylthioethyl methacrylate and 0.02 part of azodiisobutyronitrile. This solution was filmed on a plate which was air-dried and then baked at 150° C. for 15 minutes. A clear, excessively glossy film resulted with a pencil hardness of 3H.

There were mixed 8.2 parts of the above 40% solution of copolymer from methyl methacrylate and ethyl acrylate, one part of 2-vinylthioethyl methacrylate, 7.5 parts of ethylenedichloride, 0.0025 part of diisobutyloxyethoxyethylbenzyldimethyl ammonium chloride monohydrate as a 25% solution in butanol, and 0.027 part of diisopropylbenzenehydroperoxide as a 50% solution in alcohol and ketone. The resulting solution was filmed on a plate which was air-dried for 45 minutes and baked at 150° C. for 30 minutes. A clear, glossy film resulted with a hardness of 5H.

I claim
1. Graft copolymers of

$$CH_2=CHSC_nH_{2n}(OC_nH_{2n})_mOCOCR=CHR°$$

wherein

R and R° are members of the class consisting of hydrogen and the methyl group with the proviso that only one of R and R° is a methyl group in any single compound, $n$ is an integer from 2 to 3 with at least two carbons between S and O, and $m$ has a value of 0 to 1 and of a preformed polymer of at least one other monovinylidene compound.

2. Graft copolymers of $$CH_2=CHSC_nH_{2n}(OC_nH_{2n})_mOCOCR=CHR°$$

wherein

R and R° are members of the class consisting of hydrogen and the methyl group with the proviso that only one of R and R° is a methyl group in any single compound, $n$ is an integer from 2 to 3 with at least two carbons between S and O, and $m$ has a value of 0 to 1 and of a preformed polymer of at least one acrylic ester.

References Cited in the file of this patent
UNITED STATES PATENTS

| | | |
|---|---|---|
| 2,582,911 | Neher et al. | Jan. 15, 1952 |
| 2,692,256 | Bauer et al. | Oct. 19, 1954 |
| 2,780,567 | Kine et al. | Feb. 5, 1957 |

OTHER REFERENCES

Lowy et al.: "An Introduction to Organic Chemistry" (6th edition, 1945), published by John Wiley and Sons, Inc., New York, chapter XVIII, page 213.